United States Patent
Poss et al.

(10) Patent No.: US 7,290,831 B2
(45) Date of Patent: Nov. 6, 2007

(54) VEHICLE WITH LAYERED ROOF BUILD

(75) Inventors: Michael G. Poss, Rochester Hills, MI (US); Anthony V. Minatel, Fenton, MI (US); Bryan F. Lake, Macomb, MI (US); James J. Janick, Sterling Heights, MI (US); Mark J. McGuire, Amherstburg (CA); Raymond F. Roantree, Rochester Hills, MI (US); Michael D. Regiec, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/399,252

(22) Filed: Apr. 6, 2006

(65) Prior Publication Data

US 2007/0236051 A1    Oct. 11, 2007

(51) Int. Cl.
*B60J 7/00* (2006.01)
(52) U.S. Cl. .................. 296/203.03; 296/210
(58) Field of Classification Search .......... 296/203.03, 296/210, 185.1, 193.05, 203.01
See application file for complete search history.

(56) References Cited

U.S. PATENT DOCUMENTS

| | | | | |
|---|---|---|---|---|
| 4,452,483 A | * | 6/1984 | Kano et al. ................. | 296/213 |
| 4,618,181 A | * | 10/1986 | Tokuda et al. ............... | 296/210 |
| 4,834,448 A | * | 5/1989 | Sakamoto et al. .......... | 296/210 |
| 4,883,310 A | * | 11/1989 | Miyazaki et al. ........... | 296/210 |
| 5,380,978 A | | 1/1995 | Pryor | |
| 6,126,230 A | * | 10/2000 | Ikeda et al. .................. | 296/210 |
| 6,517,144 B2 | * | 2/2003 | Kobayashi ............. | 296/187.05 |
| 6,550,851 B2 | * | 4/2003 | Seifert .................... | 296/193.04 |
| 6,672,655 B2 | * | 1/2004 | Zinsmeister et al. ........ | 296/210 |
| 6,848,739 B2 | * | 2/2005 | Stallfort et al. ............. | 296/215 |
| 6,962,389 B2 | * | 11/2005 | Katsuma ................. | 296/193.05 |
| 7,004,536 B2 | * | 2/2006 | Wieber .................... | 296/146.6 |
| 7,182,381 B2 | * | 2/2007 | Ogawa et al. .............. | 296/210 |
| 2005/0116509 A1 | * | 6/2005 | Ido et al. .................... | 296/210 |

FOREIGN PATENT DOCUMENTS

| | | |
|---|---|---|
| DE | 19523005 | 1/1996 |
| DE | 19857565 | 6/2000 |
| DE | 10061309 | 6/2002 |
| EP | 1043215 | 10/2000 |
| EP | 1321355 | 6/2003 |

* cited by examiner

*Primary Examiner*—Kiran B. Patel

(57) ABSTRACT

The invention contemplates a body structure for a vehicle. The body structure includes a roof panel and a side frame. The attachment flange of an outer body side panel includes a roof mounting portion with a dual angle, a glass mounting portion at an angle that matches one of the dual angles, and a transition area where the dual angle of the roof mounting portion tapers to the glass mounting portion with the single angle.

13 Claims, 4 Drawing Sheets

VEHICLE WITH LAYERED ROOF BUILD

BACKGROUND OF THE INVENTION

The present invention relates generally to a vehicle having a body structure designed to allow for layered roof build construction.

The typical construction of an automotive vehicle involves joining various individual stamped sheet metal parts into multi-piece subassemblies. Commonly, there are four main large subassemblies, which are the underbody, the left-hand body side, the right-hand body side, and the roof. A conventional method of joining the subassemblies together, referred to as modular roof construction, involves clamping together the main subassemblies plus some smaller parts in tooling called a framing station. The parts are then joined, by welding or other means, while in this framing station. For various design, costs, and structural reasons associated with particular vehicles, the modular roof construction assembly method may be less desirable than a method where the roof is attached to the other main subassemblies after the framing station.

A layered build roof construction method allows the roof to be joined to the other large subassemblies after the framing station. This, of course, requires a special design that allows the roof to be mounted on and affixed to the other body structure after the other main subassemblies have been joined in the framing station. Such designs must also allow for tolerances between the roof and other body structure, since the other main subassemblies that make up the other body structure have already been permanently attached to each other.

One such design for a layered build roof construction mounts the roof to an outer body side panel with an intentional gap between the upper surfaces of the two. This allows for both mounting the roof after the framing station and accepting tolerances in the body structure. This gap, with the welding at the bottom of the gap, is then covered with a plastic or rubber roof molding to hide the welds and fill in the gap. The roof moldings, however, add to the cost of the vehicle, as well as limit the design options for the visual appearance of the vehicle.

Another design for a layered build roof construction eliminates the roof molding by providing a roof with side mounting flanges angled at approximately 45 degrees that mate with corresponding angled mounting flanges on outer body side panels in order to allow for tolerances between the width of the roof and the distance between the outer body side panels. A high-quality joining method, such as laser brazing attachment, is then used to provide an outer surface with a quality appearance without requiring a roof molding.

But this other design creates an issue at the roof corner—that is, the location where the body side frame, roof panel, and windshield come together. Namely, the flanges of the roof and body side frame come together at an angle of about 45 degrees in order to allow for the tolerances in the parts and assembly, but the body side frame provides a portion of the surround for the glass attachment, which needs an angle of about 83 degrees in order to mount the glass properly. To avoid this discontinuity, and possible creation of a hole that would need to be sealed, the roof and windshield flanges are offset so they are not in-line. A plastic or rubber windshield molding is then added along the body side frame over the windshield in order to give the aesthetically pleasing appearance that the roof and windshield are aligned with one another. Unfortunately, with this design, the savings from eliminating roof moldings is significantly reduced or eliminated because of the need to add windshield moldings. Moreover, the ability to style the vehicle as desired is again limited due to the fact that this windshield molding is needed.

It is desirable, therefore, to provide a body structure for a vehicle that allows for a layered build roof construction, while also eliminating the need for roof or glass moldings and still maintaining an aesthetically pleasing vehicle appearance.

SUMMARY OF INVENTION

An embodiment of the present invention contemplates a body structure for a vehicle. The body structure includes a roof panel and a side frame. The roof panel has a main section and a side mounting flange extending from and angled greater than 90 degrees downward relative to the main section. The side frame includes an outer body side panel having an attachment flange with a roof mounting portion, a transition area, and a glass mounting portion. The glass mounting portion is oriented at a first angle, and the roof mounting portion has a roof mounting surface oriented at a second angle that is less than the first angle and an adjacent lower portion oriented at the first angle. The side mounting flange is attached to the roof mounting surface. The transition area has a first end adjacent to the roof mounting portion having a first portion oriented at the second angle and a lower portion adjacent to the first portion and oriented at the first angle, a second end adjacent to the glass mounting portion and oriented at the first angle, and a tapered region wherein a width of the first portion tapers down to zero from the first end to the second end.

An embodiment according to the present invention may also contemplate a body structure for a vehicle. The body structure has a side frame including an outer body side panel having an attachment flange with a roof mounting portion, a transition area, and a glass mounting portion. The glass mounting portion is oriented at a first angle. The roof mounting portion has a roof mounting surface oriented at a second angle that is less than the first angle, an adjacent lower portion oriented at the first angle, and an upper portion adjacent to the roof mounting surface that is oriented at the first angle, with the roof mounting surface adapted to be attached to a side mounting flange of a roof panel. The transition area has a first end adjacent to the roof mounting portion having a first portion oriented at the second angle, a lower portion and an upper portion, each being adjacent to the first portion and oriented at the first angle, a second end adjacent to the glass mounting portion and oriented at the first angle, and a tapered region wherein a width of the first portion tapers down to zero from the first end to the second end.

An advantage of an embodiment of the present invention is that the need for roof or windshield moldings are eliminated, while still providing an aesthetically pleasing appearance for the vehicle. This allows for reduced costs by eliminating the moldings, while at the same time minimizing the limitations on choices for vehicle styling.

Another advantage of an embodiment of the present invention is that the roof may be assembled in a layered build roof construction rather than requiring a modular roof construction, while still accounting for tolerances in the parts and assembly.

DETAILED DESCRIPTION

Figure 1:
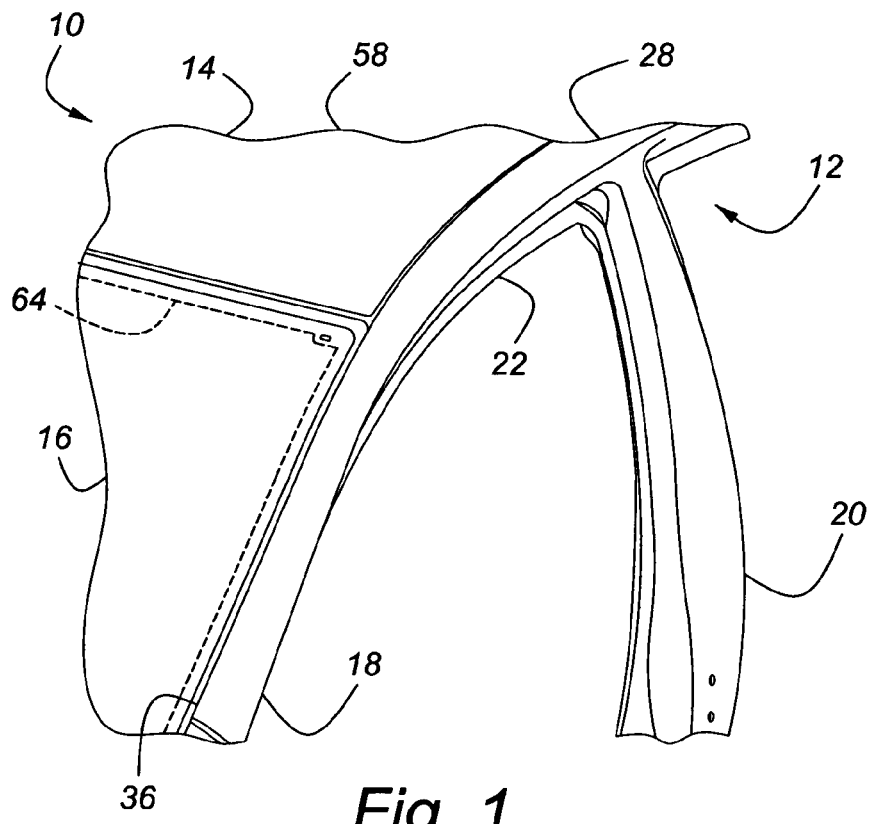
FIG. 1 is a perspective view of a portion of a body structure of a vehicle in accordance with an embodiment of the present invention.
Figure 2:
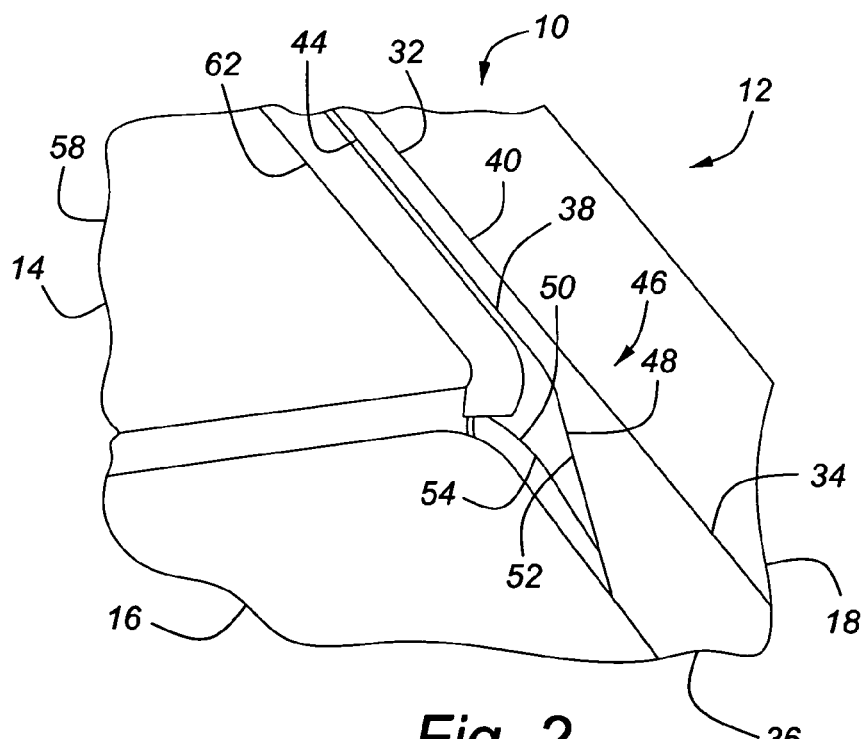
FIG. 2 is a perspective view of a portion of a body structure of a vehicle in accordance with an embodiment of the present invention.
Figure 3:
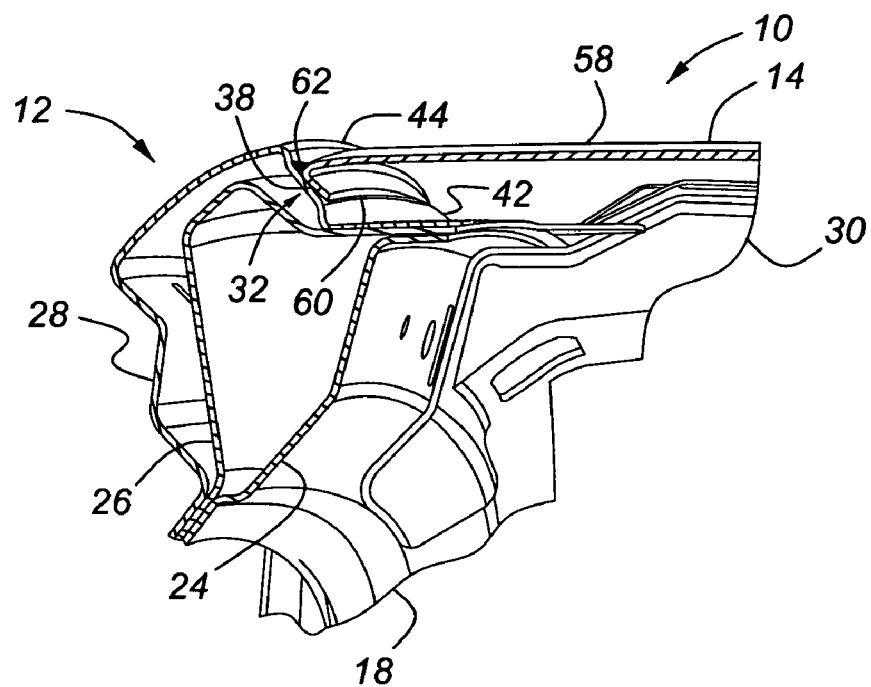
FIG. 3 is a section cut through a portion of a body structure of a vehicle in accordance with an embodiment of the present invention.
Figure 4:
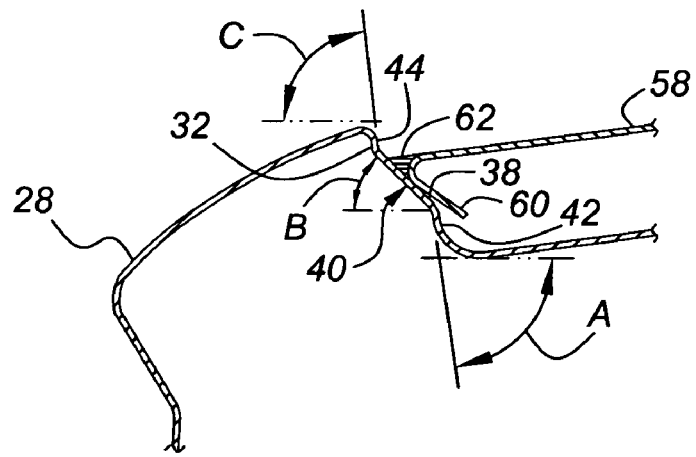
FIG. 4 shows a section cut through a portion of a body structure of a vehicle in accordance with an embodiment of the present invention.
Figure 5:
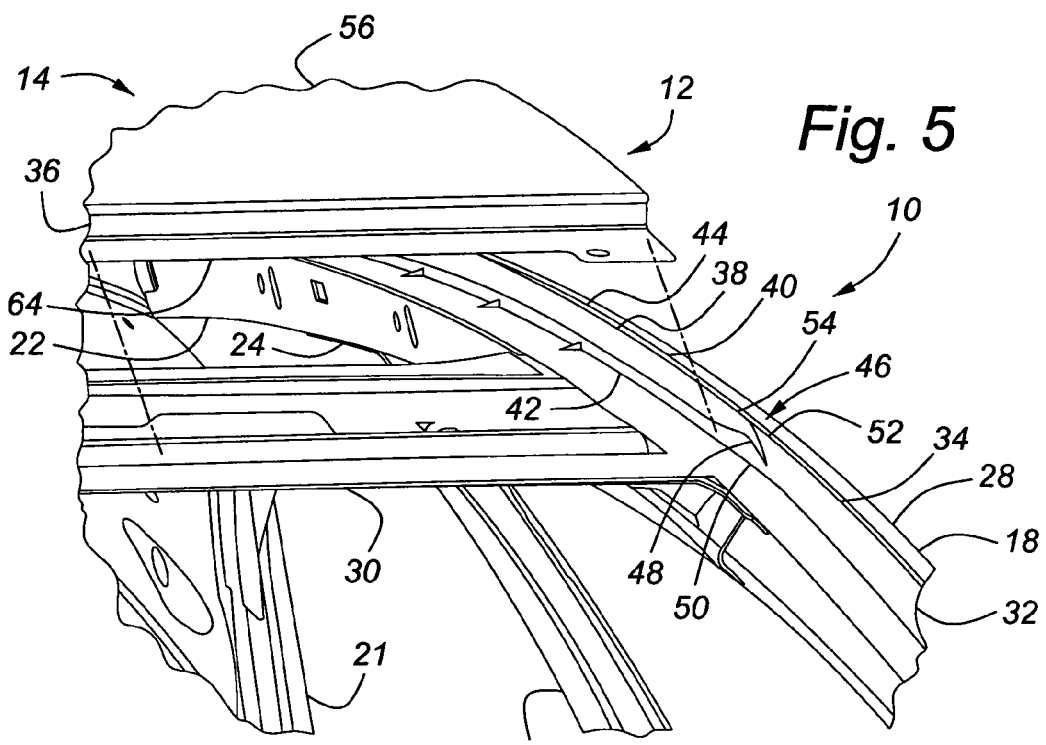
FIG. 5 is a partially exploded, perspective view of a portion of a body structure of a vehicle, prior to securing a roof to other body structure, in accordance with an embodiment of the present invention.
Figure 6:
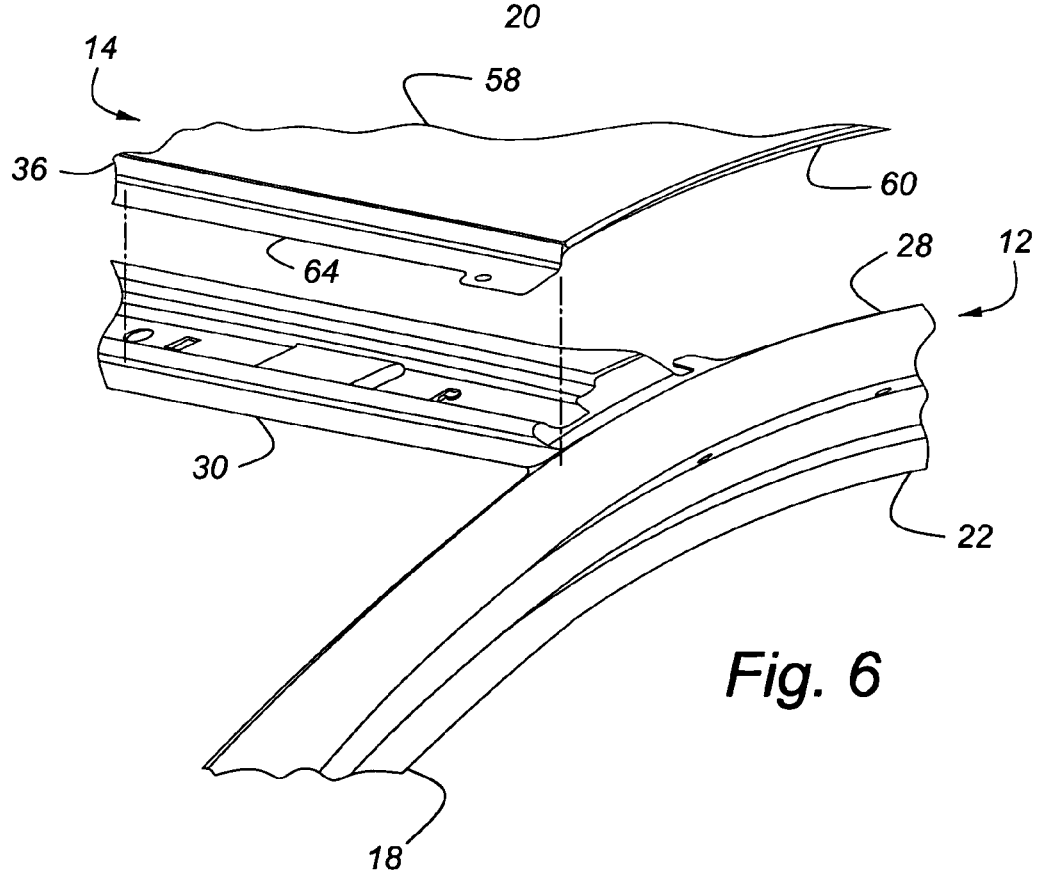
FIG. 6 is a partially exploded, perspective view of a portion of a body structure of a vehicle, prior to securing a roof to other body structure, in accordance with an embodiment of the present invention.
Figure 7:
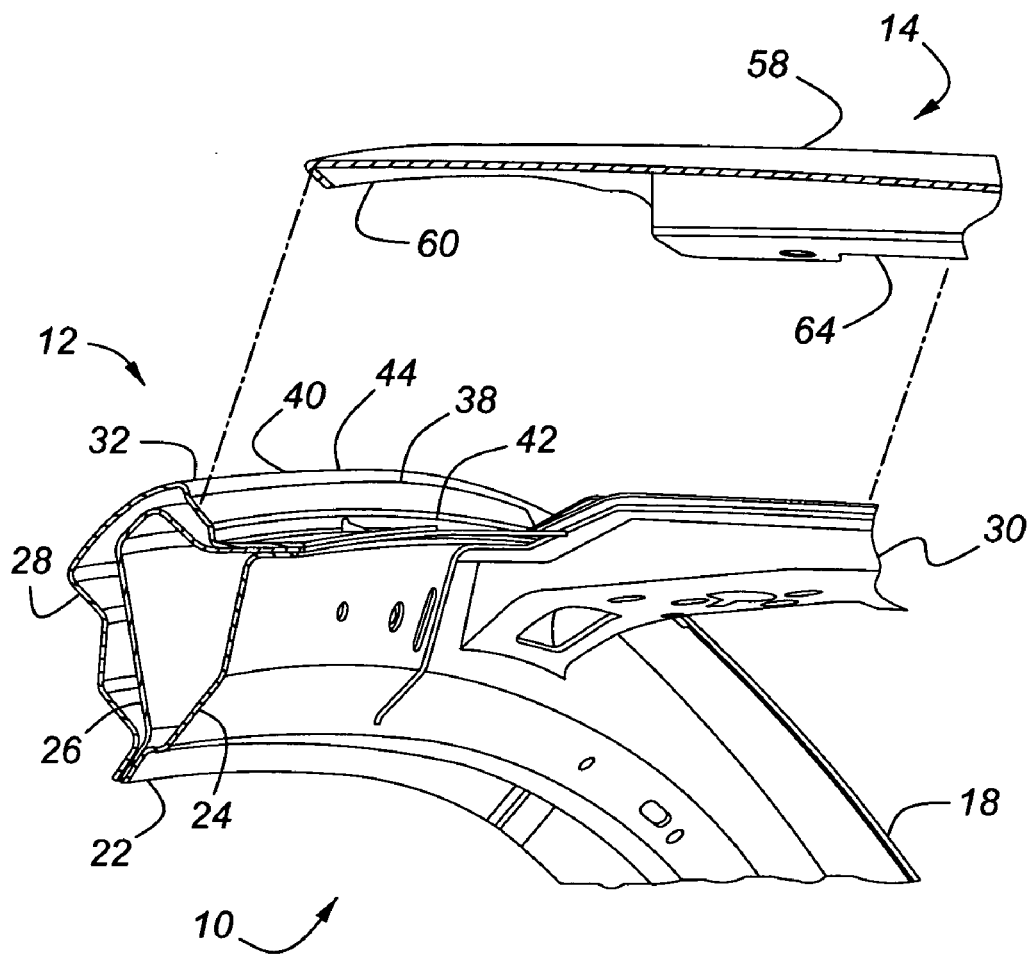
FIG. 7 shows a section cut through a portion of a body structure of a vehicle, prior to securing a roof to other body structure, in accordance with an embodiment of the present invention.

FIGS. 1-7 show a portion of a vehicle body structure, indicated generally at 10, including a body side frame 12 and a roof panel 14. FIGS. 1-4 show the body structure 10 after the roof panel 14 has been attached to the body side frame 12, while FIGS. 5-7 show the body structure 10 just prior to mounting the roof panel 14 on the body side frame 12. While only a left body side frame 12 is shown in the figures, the right side body side frame (not shown) is symmetric with the left. FIGS. 1-2 additionally show a glass panel, such as a windshield 16, mounted to the vehicle body structure 10. While the glass panel shown is a windshield 16, this invention is also applicable to the side frame 12 attachment to the rear of the roof panel 14 around the backlight (for sedan style vehicles).

The body side frame 12 is typically made up of individual stamped sheet metal parts that are welded together to form an A-pillar 18, a B-pillar 20, a C-pillar 21, and an upper portion 22 defining a door closure, as well as other vehicle features. The individual parts may include an inner body side panel 24, a body side panel 26, and an outer body side panel 28. An upper front roof header panel 30 may attach to the body side frame 12 and extend laterally across the vehicle body structure 10 to attach to the opposed body side frame (not shown). For a layered build roof construction, these parts are attached together (by welding, adhesive, fasteners, brazing, or some other suitable method) in a framing station (not shown) prior to mounting and attaching the roof panel 14 to the vehicle body structure 10, which is accomplished after the framing station.

The inner body side panel 24 and outer body side panel 28 are attached together at each end to form a closed section. Intermediate the ends of the outer body side panel 28 is an attachment flange 32. The attachment flange 32 extends longitudinally along the edges of both the roof panel 14 and the glass 16. A glass mounting portion 34 of the attachment flange 32 extends along a portion of the glass attachment surround 36, which mounts the glass 16. The glass mounting portion 34 extends along the side of the glass 16 oriented at an angle A (shown in FIG. 4) of about 83 degrees. The angle A allows for proper mounting and securing of the glass 16. This angle A may be an angle somewhere in the range of between about 75 and 88 degrees, as needed for mounting the particular glass 16. This angle A for mounting the glass 16 not only extends along the surface where the glass 16 actually mounts, but also constitutes part of the attachment flange 32 running adjacent to a roof mounting surface 38 where the roof panel 14 attaches to the body side frame 12, discussed below.

A roof mounting portion 40 of the attachment flange 32 includes the roof mounting surface 38, a lower portion 42 adjacent to and located below the roof mounting surface 38, and an upper portion 44 adjacent to and located above the roof mounting surface 38. The roof mounting surface 38 is oriented at an angle B (shown in FIG. 4) of about 45° but can be an angle within a range of about 35 to 65°, so long as it is sufficient to allow for part and assembly tolerances. This angle B of the roof mounting surface 38 allows the roof panel position to very up-and-down depending on the tolerances in the roof panel 14 and tolerances in spacing between body side panels, while still retaining a tight fit between the roof panel 14 and body side panels. A tight fit is desirable if one wishes to employ an attachment process, such as laser brazing, to obtain a smooth, finished appearance. The lower portion 42 is oriented at the angle A of the glass mounting portion 34, and the upper portion 44 is oriented at an angle C (shown in FIG. 4), which is preferably equal to angle A.

A transition area 46 of the attachment flange 32 extends between the roof mounting portion 40 and the glass mounting portion 34. The transition area 46 at its first end (adjacent to the roof mounting portion 40) matches the profile of the roof mounting portion 40, with a first portion 48 oriented at the angle B, and second and third portions 50, 52 located below and above the first portion 48, respectively, and oriented at the angles A, C, respectively. The transition area 46 at its second end (adjacent to the glass mounting portion 34) matches the profile of the glass mounting portion 34 at the angle A. This creates a tapered region 54 where a width of the first portion 48, which extends parallel to the roof mounting surface 38, tapers from the first end—where it is the width of the roof mounting surface 38—down to zero as it reaches the glass mounting portion 34 at the second end—where the entire width is at the angle needed for mounting the glass 16. Accordingly, the multiple angle roof mounting portion 40, along with the transition area 46, allows for a smooth transition between the two mounting portions 34, 40 without creating discontinuities, holes or other unsightly irregularities that would need to be filled or covered with a molding.

As discussed above, in a layered build roof construction the roof panel 14 preferably mounts on the body side frame 12 after the framing station (not shown), which secures together the left body side frame 12, the corresponding right body side frame (not shown) and an underbody (not shown). By the time the vehicle body structure 10, then, is finished in the framing station, the spacing is fixed between the roof mounting portion 40 of the attachment flange 32 on the left side and the corresponding roof mounting portion (not shown) on the right side. Moreover, the roof panel 14 needs to be able to be mounted and secured to the side frames after they are already secured in the vehicle body structure 10.

The roof panel 14, then, includes a main section 58, which is generally planar, and side mounting flanges 60 (only the left shown) extending laterally from and angled greater than 90 degrees downward relative to the main section 58. Being greater than 90 degrees allows the roof panel 14 to be mounted to the body side frame 12 after the framing station. Moreover, the side mounting flanges 60 are preferably angled enough to cause line contact between each side mounting flange 60 and its corresponding roof mounting surface 38. For example, if the roof mounting surface 38 is angled at 45 degrees, then preferably the corresponding side mounting flange 60 is angled greater than 135 degrees. The line contact allows for tolerances in the angles as well as tolerances in spacing to be better absorbed while still assuring a tight fit between the side mounting flange 60 and its corresponding roof mounting surface 38.

A brazed joint 62, such as that formed by laser brazing, can then be applied to secure the roof panel 14 to the body side frame 12. While an attachment process that produces a high quality surface finish, such as laser brazing, is preferred, other types of attachment processes may be employed instead, if so desired.

The roof panel 14 may also include a front mounting flange 64 extending generally forward from the main section 58. The front mounting flange 64 mounts to the upper front roof header panel 30, forming an uppermost portion of the glass attachment surround 36 that extends laterally to the attachment flange 32 of the body side frame 12. Thus, a smooth and aesthetically pleasing roof corner 66 is created for this vehicle body structure 10.

While certain embodiments of the present invention have been described in detail, those familiar with the art to which this invention relates will recognize various alternative designs and embodiments for practicing the invention as defined by the following claims.

What is claimed is:

1. A body structure for a vehicle comprising:
   a roof panel having a main section and a side mounting flange extending from and angled greater than 90 degrees downward relative to the main section; and
   a side frame including an outer body side panel having an attachment flange with a roof mounting portion, a transition area, and a glass mounting portion; wherein the glass mounting portion is oriented at a first angle, the roof mounting portion has a roof mounting surface oriented at a second angle that is less than the first angle and an adjacent lower portion oriented at the first angle, with the side mounting flange attached to the roof mounting surface, and the transition area has a first end adjacent to the roof mounting portion having a first portion oriented at the second angle and a lower portion adjacent to the first portion and oriented at the first angle, a second end adjacent to the glass mounting portion and oriented at the first angle, and a tapered region wherein a width of the first portion tapers down to zero from the first end to the second end.

2. The body structure of claim 1 wherein the roof mounting portion includes an upper portion adjacent to the roof mounting surface that is oriented at the first angle.

3. The body structure of claim 2 wherein the second angle is between about 35 and 65 degrees.

4. The body structure of claim 2 wherein the first angle is between about 75 and 88 degrees.

5. The body structure of claim 1 further including a glass panel having a side edge mounted along the glass mounting portion.

6. The body structure of claim 5 wherein the glass panel is a windshield.

7. The body structure of claim 1 wherein the side frame is a left side frame of the vehicle.

8. The body structure of claim 1 wherein the second angle is between about 35 and 65 degrees.

9. The body structure of claim 8 wherein the first angle is between about 75 and 88 degrees.

10. The body structure of claim 1 wherein the first angle is between about 75 and 88 degrees.

11. The body structure of claim 1 further including a brazed joint attaching the side mounting flange to the roof mounting surface.

12. The body structure of claim 1 further including an upper front roof header panel attached to the side frame, and wherein the roof panel includes a front mounting flange that is attached to the upper front roof header.

13. The body structure of claim 1 wherein the angle of the side mounting flange is large enough to cause line contact between the side mounting flange and the roof mounting surface.

* * * * *

(12) INTER PARTES REEXAMINATION CERTIFICATE (1024th)

United States Patent
Poss et al.

(10) Number: US 7,290,831 C1
(45) Certificate Issued: Jan. 8, 2015

(54) VEHICLE WITH LAYERED ROOF BUILD

(75) Inventors: Michael G. Poss, Rochester Hills, MI (US); Anthony V. Minatel, Fenton, MI (US); Bryan F. Lake, Macomb, MI (US); James J. Janick, Sterling Heights, MI (US); Mark J. McGuire, Amherstburg (CA); Raymond F. Roantree, Rochester Hills, MI (US); Michael D. Regiec, Clarkston, MI (US)

(73) Assignee: GM Global Technology Operations LLC, Detroit, MI (US)

Reexamination Request:
No. 95/001,859, Dec. 20, 2011

Reexamination Certificate for:
Patent No.: 7,290,831
Issued: Nov. 6, 2007
Appl. No.: 11/399,252
Filed: Apr. 6, 2006

(51) Int. Cl.
*B60J 7/00* (2006.01)
*B62D 25/06* (2006.01)

(52) U.S. Cl.
CPC ................................ *B62D 25/06* (2013.01)
USPC .................................. 296/203.03; 296/210

(58) Field of Classification Search
None
See application file for complete search history.

(56) References Cited

To view the complete listing of prior art documents cited during the proceeding for Reexamination Control Number 95/001,859, please refer to the USPTO's public Patent Application Information Retrieval (PAIR) system under the Display References tab.

*Primary Examiner* — Peter C English

(57) ABSTRACT

The invention contemplates a body structure for a vehicle. The body structure includes a roof panel and a side frame. The attachment flange of an outer body side panel includes a roof mounting portion with a dual angle, a glass mounting portion at an angle that matches one of the dual angles, and a transition area where the dual angle of the roof mounting portion tapers to the glass mounting portion with the single angle.

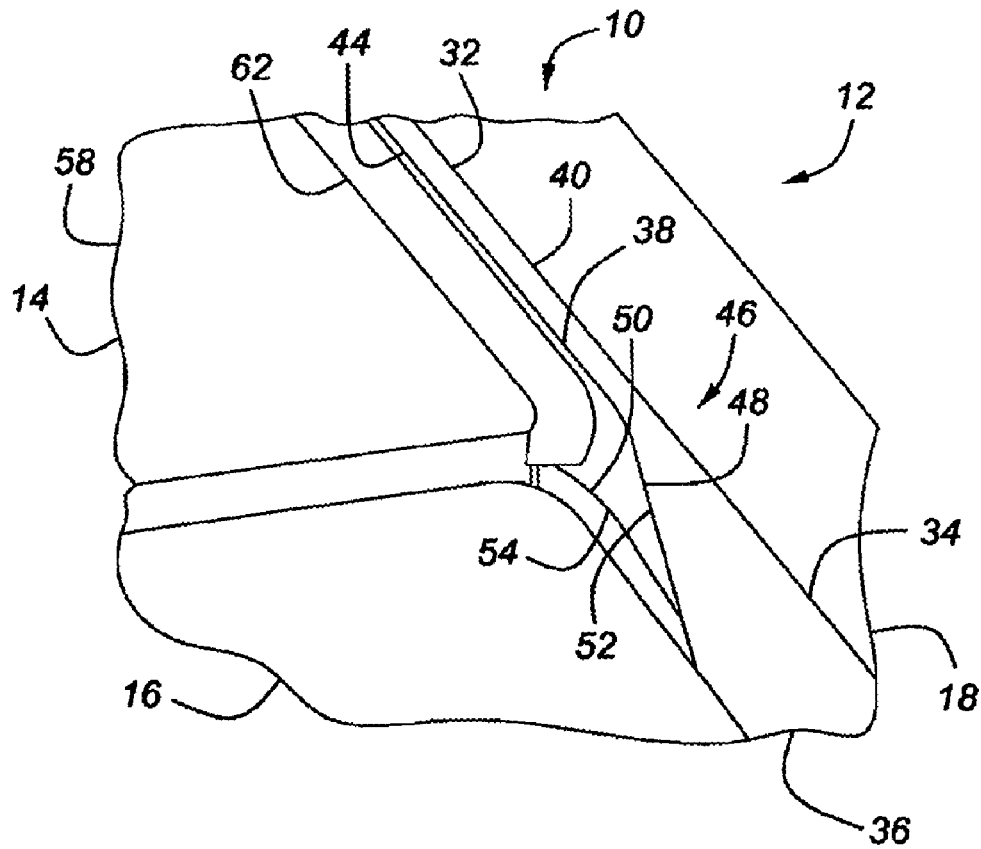

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1 and 5-13 is confirmed.

Claims 2-4 were not reexamined.

\* \* \* \* \*